Patented Dec. 3, 1929

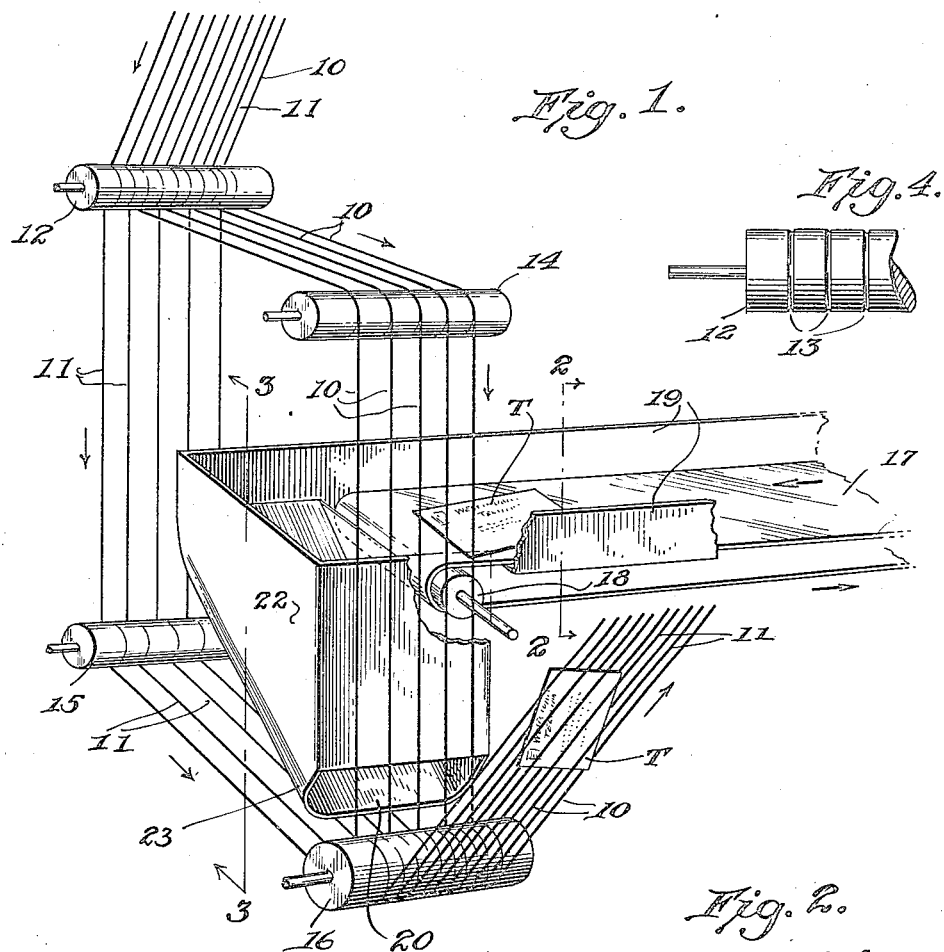

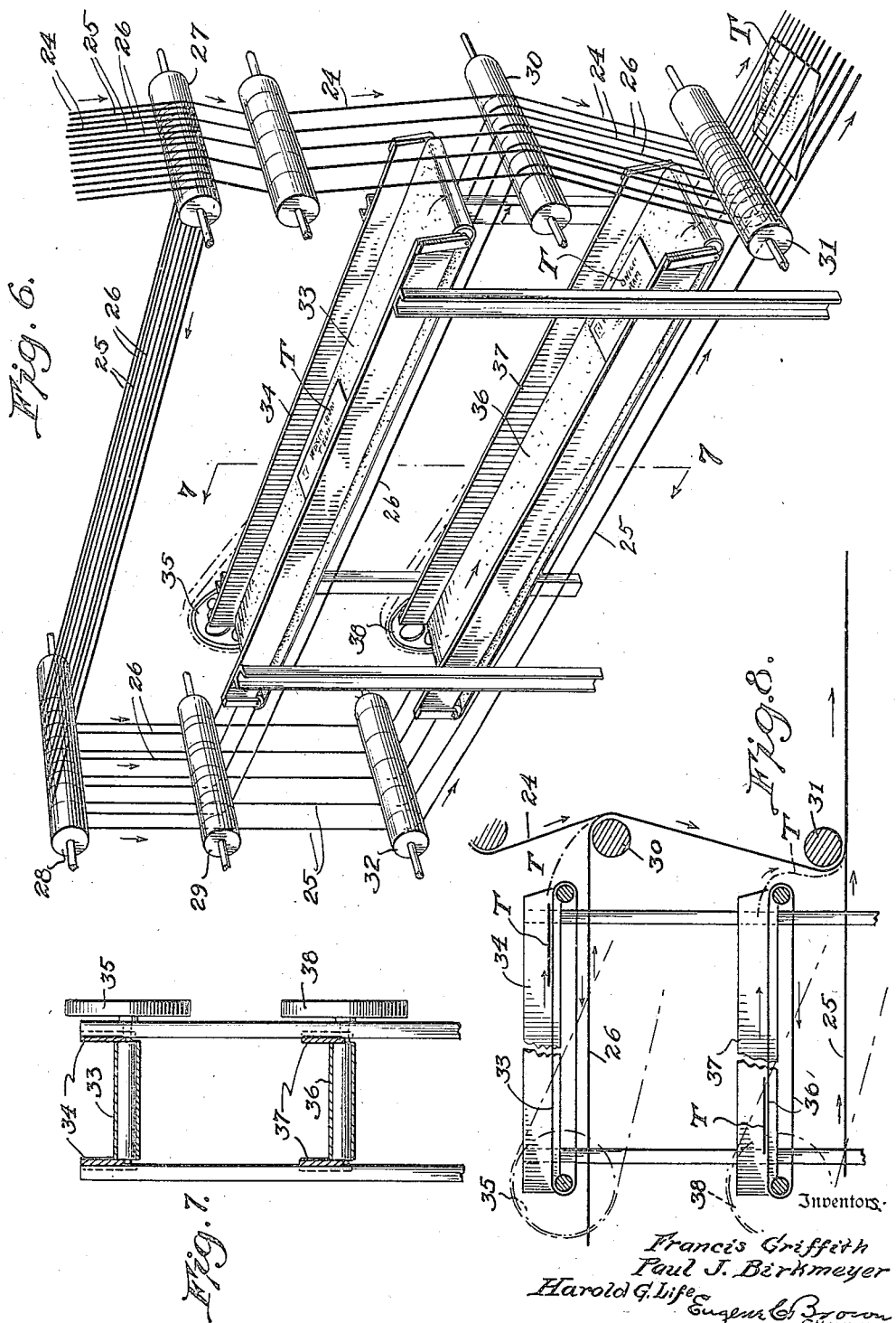

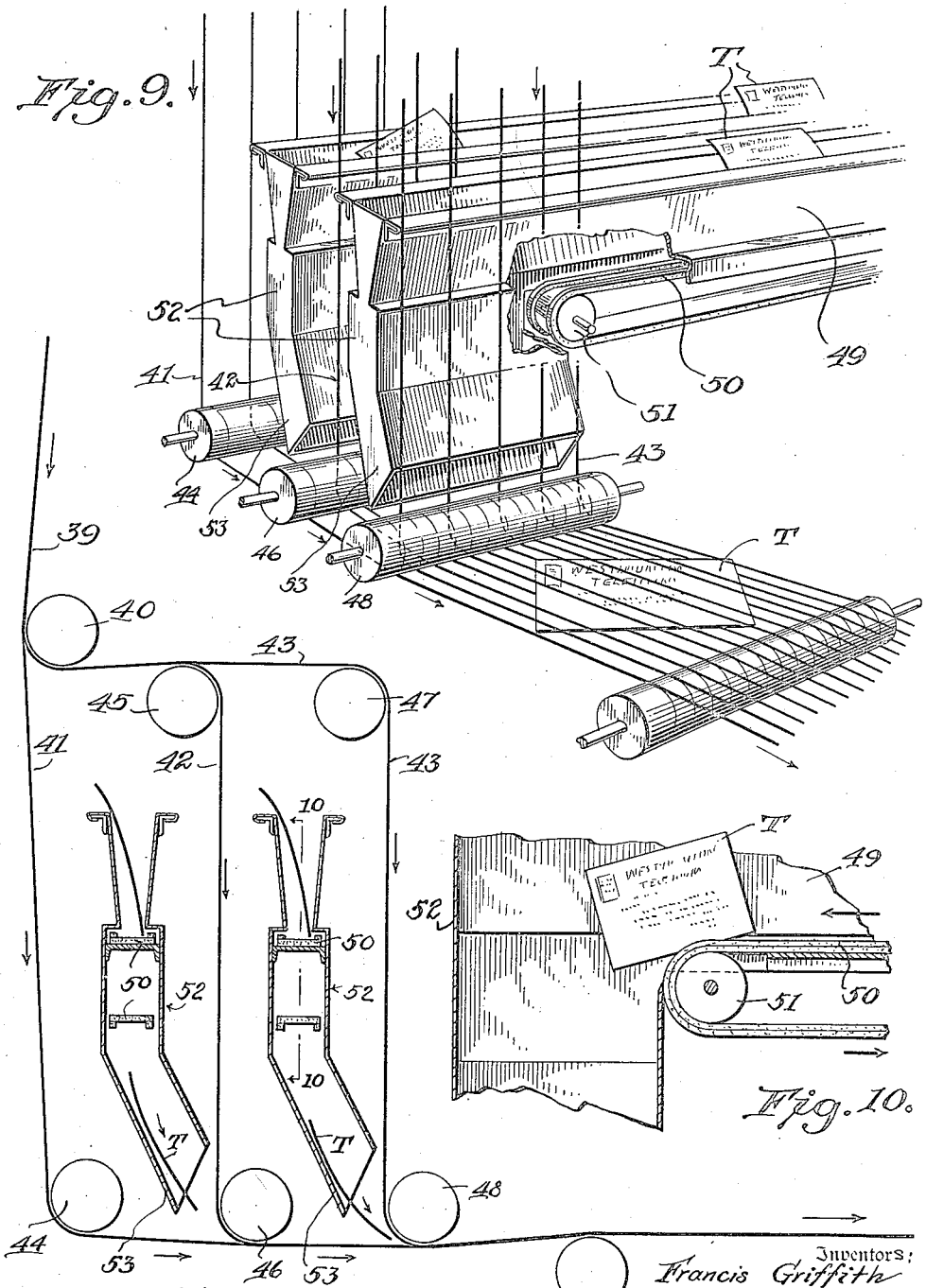

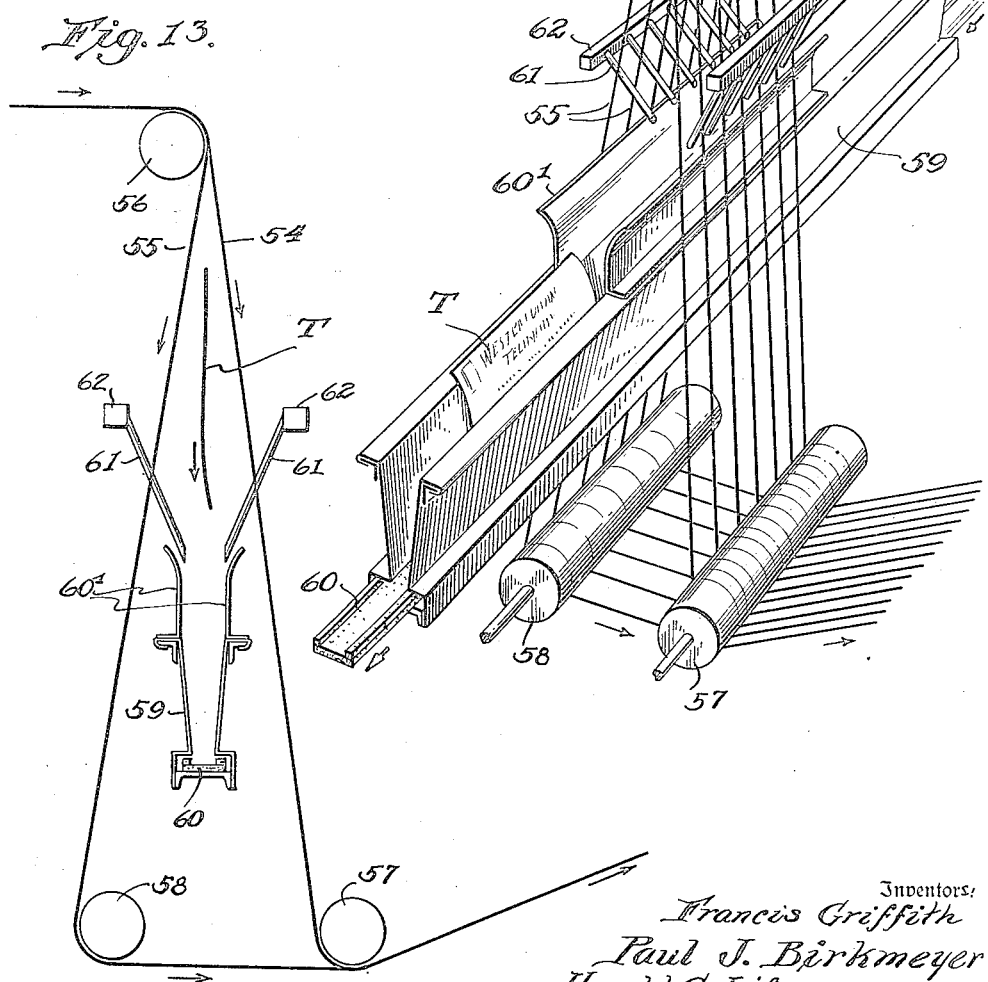

1,738,427

UNITED STATES PATENT OFFICE

FRANCIS GRIFFITH, OF PASSAIC, NEW JERSEY, AND PAUL J. BIRKMEYER AND HAROLD G. LIFE, OF BROOKLYN, NEW YORK, ASSIGNORS TO THE WESTERN UNION TELEGRAPH COMPANY, OF NEW YORK, N. Y., A CORPORATION OF NEW YORK

CONVEYER SYSTEM

Application filed April 8, 1929. Serial No. 353,553.

This invention relates to conveyer systems and has special reference to conveyer systems employing endless belt types of conveyers for the transportation of flat parcels or packages such as telegrams, letters and the like, the several conveyors of the system being especially arranged for this purpose.

Among the objects of the present invention is the provision of a conveyer system of novel character wherein a plurality of endless belt conveyers are employed for the transportation of flat articles, the conveyers being so arranged that the articles are transferred from one to the other of such conveyers; the provision of means for changing the direction of movement of a transferred article between the conveyers so that one conveyer may be positioned angularly with respect to another conveyer; to provide for the transfer from a series of conveyers at a transfer station of flat articles to a single conveyer of the selective delivery type so that articles received from one of the series or plurality of conveyers will be positioned on the conveyer to which they are transferred for delivery at one station, articles received from a second conveyer will be positioned for delivery at a second station and so on; and to provide for the transfer of articles between a conveyer of the ordinary belt type and a conveyer of the multiple strand type described and illustrated in the copending application filed December 31, 1927, Serial Number 243,928, now Patent No. 1,715,301.

With the above and other objects in view, the invention will now be specifically described in connection with the accompanying drawings, wherein:—

Figure 1 is a perspective view of a portion of two conveyers arranged for the transfer of articles from one to the other in accordance with this invention.

Figure 2 is a section on the line 2—2 of Figure 1.

Figure 3 is a section on the line 3—3 of Figure 1.

Figure 4 is a detail side view of a portion of one of the rollers used herewith.

Figure 5 is a diagrammatic detail section showing the transfer of articles to a strand conveyer.

Figure 6 is a perspective view of a transfer station employing two belt-conveyers and a single strand-conveyer.

Figure 7 is a section on the line 7—7 of Figure 6.

Figure 8 is a diagrammatic view illustrating the transfer of articles in the arrangement shown in Figure 6.

Figure 9 is a perspective view of a transfer station in a system employing a plurality of belt and trough conveyers and a single strand-conveyer.

Figure 10 is a section on the line 10—10 of Figure 11.

Figure 11 is a diagrammatic view of the arrangement of parts shown in Figure 9.

Figure 12 is a perspective view showing a transfer station arranged for transferring articles from a strand conveyer to a conveyer of the trough and belt type.

Figure 13 is a diagrammatic section through the arrangement shown in Figure 12 to illustrate the transfer of such articles.

Referring now to the form of the invention illustrated in Figures 1 to 5 inclusive it will be seen that there is employed a strand conveyer of the same general type as that disclosed in the copending application bearing the Serial Number 243,928. It will also be noted that the strand conveyer of the other forms hereinafter described is likewise of this same general type. There is here shown only that part of the strand conveyer which relates especially to the arrangement for forming a transfer or delivery and receiving station, the remainder of the strand conveyer and the arrangement for selectively delivering articles carried thereby to several stations being set forth in the aforesaid copending application to which reference may be had with regard thereto. As here shown the strand conveyer consists of a series of laterally spaced traveling strands 10 and 11, arranged in Figures 1 to 5 alternately. Normally these strands travel in the same plane and pass over rollers 12 preferably provided with grooves 13 to maintain the strands in proper spaced relation. At the transfer station the strands 10 are deflected out of the path of the remaining strands to pass over a roller 14 of the same type as the roller 12 while the strands 11 are continued in their usual path down to a roller 15 also of the ordinary type. From the roller 14 the strands 10 pass downwardly and under a roller 16, the strands 11 running from the roller 15 to this roller 16 also so that the strands 10 and 11 are thus brought back to move in the same plane. By means of this arrangement a shed is formed corresponding to the shed of a weaving machine or loom where the warp strands are separated to permit the passage of the shuttle. By reason of this close analogy the opening formed in this manner by separating certain of the strands from the remainder will be termed a shed throughout this specification.

An ordinary flat belt conveyer having a conveyer belt 17 extending over a roller or idler 18 leads to the shed thus formed and preferably the upper or delivery run of the belt 17 operates in a shallow trough having sides or guards 19 to prevent articles on the belt from slipping or being blown off of such belt. The roller 18 is located close to one side of the shed and at this end of the belt conveyer there is provided a trough having a downwardly inclined bottom 20 located in the shed and having its lower edge close to the roller 16 so that articles sliding off of this bottom will be delivered between the strands 10 and 11 just at the point where they pass under the roller 16, the telegram T or other article being thus gripped between the strands 10 and the strands 11. The sides of the trough are perpendicular at the upper part and are curved or rounded at the lower portions, so that the telegram blanks delivered from the belt 17 will be guided into proper position to engage between the strands 10 and 11, as indicated in Figs. 3 and 5.

In the form of the invention shown in Figures 6 to 8 the system is arranged for use in sending telegrams to a plurality of stations. To that end, as set forth in our copending application, certain of the telegrams or other articles are held by the strand conveyer with certain strands above them while others of such telegrams are held with other strands above them. In the present showing the arrangement for selectively sending telegrams to two receiving stations or points is disclosed but it will be obvious that by a simple multiplication of parts the number of stations or points to which telegrams are to be delivered may be indefinitely extended. In this arrangement there are three sets of strands 24, 25 and 26 running on the main run of the strand conveyer in the same plane and at the transfer station there is provided a roller 27 and a roller 28 parallel thereto. The strands 25 and 26 are carried under the roller 27 and over the roller 28 while the strands 24 continue along what may be termed the main path of the conveyer. Below the roller 28 is a roller 29 and the strands 26 pass down from the roller 28 to run under the roller 29 and forwardly to a point below the roller 27 where they pass downwardly over a roller 30, the strands 24 also passing downwardly over this roller and the reassembled strands 24 and 26 passing from the roller 30 down to and under a roller 31 spaced below the roller 30. The strands 25 continue downwardly past the roller 29 and pass forwardly under a roller 32 to the roller 31 where they are reassembled with the strands 24 and 26 to make the outgoing run of the strand belt. By means of this arrangement two sheds are formed, one between the strands 24 and 26 and the other between the strands 24 and 26 and the strands 25 in the horizontal run of said strands. In the upper shed there is provided a belt conveyer having an ordinary belt 33 running between guard sides 34 and driven from a wheel 35 while in the lower shed there is provided a similar belt 36, guard sides 37 and pulley 38. At the receiving station the strands will be separated in like manner so that at one station the telegrams held between the strands 24 and the strands 26 and 25 will be released while at the other station telegrams held between the strands 24 and 26 and the strands 25 will be released as explained in our copending application. A station of this kind as shown in Figure 6 may be used as a sorting station, telegrams intended for delivery at one point being dropped on the belt 33 while those intended for delivery at another point are dropped on the belt 36.

In the arrangement of the device shown in Figures 9 to 11 inclusive the arrangement is quite similar in purpose to that shown in Figure 6 but in this case the main run of the strand belt approaching the transfer station is indicated in Figure 11 at 39 and this main run passes behind and below a roller 40. In this arrangement, as in Figure 6, three sets of strands have been disclosed but obviously as many more may be used as desired. The strands of these three sets are indicated respectively at 41, 42 and 43 and the strands 41 pass downwardly from the roller 40 to and under a roller 44. The strands 42 and 43 pass forwardly from the roller 40 and on arrival at a roller 45, spaced below and forwardly of the roller 40, the strands 42 are carried over the roller 45 to pass downwardly and under a roller 46 at which point they unite with the strands 41 from the roller 44. The strands 43, after passing over the roller 45, pass over a roller 47 forwardly of the roller 45 and then down to pass under a roller 48 and there be assembled with the strands 41 and 42 from the roller 46 so that after leaving the roller 48 all three sets of strands are again assembled. Thus two sheds are formed in this instance, one between the strands 41 and the strands 42 in their vertical runs and the other between the vertical runs of the strands 42 and the strands 43. In connection with this arrangement there is shown a type of belt conveyer employing a narrow trough 49 arranged at the bottom to receive the forwardly moving run of a belt 50 which passes around a roller 51 adjacent the respective shed. Naturally, there are two of these conveyers, one for each shed. Telegrams T are carried along these conveyers in substantially vertical position and are delivered at the ends of the conveyers to downwardly and forwardly extending delivery chutes 52 having the lower parts 53 of their bottom sides positioned to deliver the telegrams T into the angle between the separated strands of the respective sheds as shown in Figure 11.

In some instances it is desirable to deliver the telegrams or letters or other articles carried by the strand belt to a belt conveyer of the type disclosed in Figure 9 and to that end the arrangement shown in Figures 12 and 13 may be used. In this arrangement it will be seen that there are two sets of strands, the strands of one set being indicated at 54 while the strands of the other set are indicated at 55. The run of the strand conveyer approaching the transfer station passes over a roller 56, both sets of strands passing downwardly but one set 54 being inclined forwardly to pass under a lower roller 57 while the other set 55 is inclined rearwardly to pass under a roller 58 and then forwardly to the roller 57 where the two sets are again united. This forms a substantially triangular shed and through this shed runs a narrow trough 59 having a conveyer belt 60 at its bottom. The telegrams T are held between the strands 54 and the strands 55 and as these strands are separated, after passing the roller 56, the telegrams are released and dropped downwardly into the trough. In order to guide these telegrams into proper position in such trough the conveyer trough 59 has, on that portion of its sides within the shed upstanding and flaring wall extensions 60' and through the spaces between the respective sets of strands above this wall extension pass guide fingers 61 which are inclined downwardly and inwardly toward each other from supporting bars 62. Thus when the telegrams are freed the guide fingers, passing through the spaces between the strands, direct the telegrams into proper position between the trough extensions 60' and thus into the trough and onto the belt 60.

Having thus described the invention, what is claimed as new, is:

1. The combination with a conveyer system comprising a series of laterally spaced normally parallel strands, and means to deflect certain of said strands out of the path of the remaining strands and to return them to the path of said remaining strands whereby to form a shed; of a second conveyer having at least one portion lying within the shed thus formed, and means whereby articles conveyed by one of said conveyers may be transferred to the other.

2. The combination with a conveyer system comprising a series of laterally spaced normally parallel strands, and means to deflect certain of said strands out of the path of the remaining strands and to return them to the path of said remaining strands whereby to form a shed; of a second conveyer having at least one portion lying within the shed thus formed, and a guide member within the shed receiving conveyed articles from one of said conveyers and delivering the same to the other conveyer.

3. The combination with a conveyer system comprising a series of laterally spaced normally parallel strands, means to deflect certain of said strands out of the path of the remainder of said strands and into paths spaced at a plurality of distances from said remainder, and means to return the deflected strands to the path of the remainder of the strands whereby to form a plurality of sheds between the strands running in different paths; of a plurality of other conveyers each having at least one portion associated with a respective shed, and means whereby articles may be transferred between the strand conveyer and said other conveyers.

4. The combination with a conveyer system comprising a series of laterally spaced normally parallel stands, means to deflect certain of said strands out of the path of the remander of said strands and into paths spaced at a plurality of distances from said remainder, and means to return the deflected strands to the path of the remainder of the strands whereby to form a plurality of sheds between the strands running in different paths; of a plurality of other conveyers each having at least one portion associated with a respective shed, a guide member in each shed arranged to guide articles for transfer between the strand conveyer and the last mentioned conveyer associated with the respective shed.

5. The combination with a conveyer system comprising a series of laterally spaced normally parallel strands, and means to deflect certain of said strands out of the path of the remaining strands and to return them to the path of said remaining strands whereby to form a shed; a second conveyer extending angularly from the first conveyer at said shed, and a guide chute positioned within said shed and receiving articles from one of said conveyers and delivering them to the other conveyer.

6. The combination with a conveyer system comprising a series of laterally spaced normally parallel strands, and means to deflect certain of said strands out of the path of the remaining strands and to return them to the path of said remaining strands whereby to form a shed; of a belt conveyer having one end positioned at said shed and extending laterally from the first conveyer, and a guide chute in said shed extending from said belt conveyer and having an inclined delivery surface leading towards the point at which the deflected strands are returned to the path of the remaining strands.

7. The combination with a conveyer system comprising a series of laterally spaced normally parallel strands, and means to deflect certain of said strands out of the path of the remaining strands and to return them to the path of said remaining strands whereby to form a shed; of a belt conveyer extending through said shed, a trough wherein said belt conveyer runs, and sets of guide fingers extending respectively between the spaces between the deflected strands and the spaces between the remaining strands into said shed above said trough to direct articles from the strand conveyer into the trough.

In testimony whereof we affix our signatures.

FRANCIS GRIFFITH.
PAUL J. BIRKMEYER.
HAROLD G. LIFE.